United States Patent [19]
Kono

[11] Patent Number: 6,101,374
[45] Date of Patent: Aug. 8, 2000

[54] RADIO COMMUNICATION APPARATUS HAVING TWO ANTENNAS CONTROLLED BY STANDING WAVE RATIO

[75] Inventor: Shinichi Kono, Tokyo, Japan

[73] Assignee: NEC Corporation, Japan

[21] Appl. No.: 09/052,500

[22] Filed: Mar. 31, 1998

[30] Foreign Application Priority Data

Mar. 31, 1997 [JP] Japan ............................. 9-096514

[51] Int. Cl.[7] ........................................... H04B 1/04
[52] U.S. Cl. .................... 455/115; 455/101; 455/103; 455/129; 455/78; 455/117
[58] Field of Search .................... 455/101, 103, 455/115, 129, 78, 97, 117; 343/703, 876

[56] References Cited

U.S. PATENT DOCUMENTS

| | | | |
|---|---|---|---|
| 4,538,153 | 8/1985 | Taga | 343/700 |
| 5,097,484 | 3/1992 | Akaiwa | 375/267 |
| 5,203,018 | 4/1993 | Hirose | 455/61 |

FOREIGN PATENT DOCUMENTS

| | | |
|---|---|---|
| 61-24334 | 2/1986 | Japan . |
| 2-136757 | 5/1990 | Japan . |
| 3-119836 | 5/1991 | Japan . |
| 4-326818 | 11/1992 | Japan . |
| 6-300803 | 10/1994 | Japan . |
| 7-38956 | 2/1995 | Japan . |

OTHER PUBLICATIONS

Japanese Office Action issued Nov. 24, 1999.

*Primary Examiner*—Dwayne D. Bost
*Assistant Examiner*—Temica M. Davis
*Attorney, Agent, or Firm*—Ostrolenk, Faber, Gerb & Soffen, LLP

[57] ABSTRACT

In a radio communication apparatus, a switch circuit is connected between a transmitter and first and second antennas. A control circuit is connected to the first antenna and the switch circuit and controls the switch circuit in accordance with a standing wave ratio measured from the first antenna. That is, when the standing wave ratio of the first antenna exceeds a predetermined value, the connection between the transmitter and the first antenna is switched to the connection between the transmitter and the second antenna.

6 Claims, 2 Drawing Sheets

RADIO COMMUNICATION APPARATUS HAVING TWO ANTENNAS CONTROLLED BY STANDING WAVE RATIO

BACKGROUND OF THE INVENTION

1. Field of the Invention

The present invention relates to a radio communication apparatus including a standing wave ratio (SWR) measuring function.

2. Description of the Related Art

In a prior art radio communication apparatus, when a mismatch with an antenna occurs, a standing wave ratio is measured between the antenna and a transmitter circuit, and the rosonance frequency is brought close to a predetermined frequency by an antenna matching circuit (see JP-A-3-119836). This will be explained later in detail.

In the above-described prior art radio communication apparatus, however, although the standing wave ratio is minimized, a mismatch between the transmitter circuit and the antenna matching circuit can be not completely removed, so that it is impossible to radiate radio waves from the antenna at a maximum efficiency.

SUMMARY OF THE INVENTION

It is an object of the present invention to provide a radio communication apparatus capable of radiating from an antenna at a maximum efficiency.

According to the present invention, in a radio communication apparatus, a switch circuit is connected between a transmitter and first and second antennas. A control circuit is connected to the first antenna and the switch circuit and controls the switch circuit in accordance with a standing wave ratio measured from the first antenna. That is, when the standing wave ratio of the first antenna exceeds a predetermined value, the connection between the transmitter and the first antenna is switched to the connection between the transmitter and the second antenna.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, a prior art radio communication apparatus will be explained with reference to FIG. 1 (see JP-A-3-119836).

Figure 1:
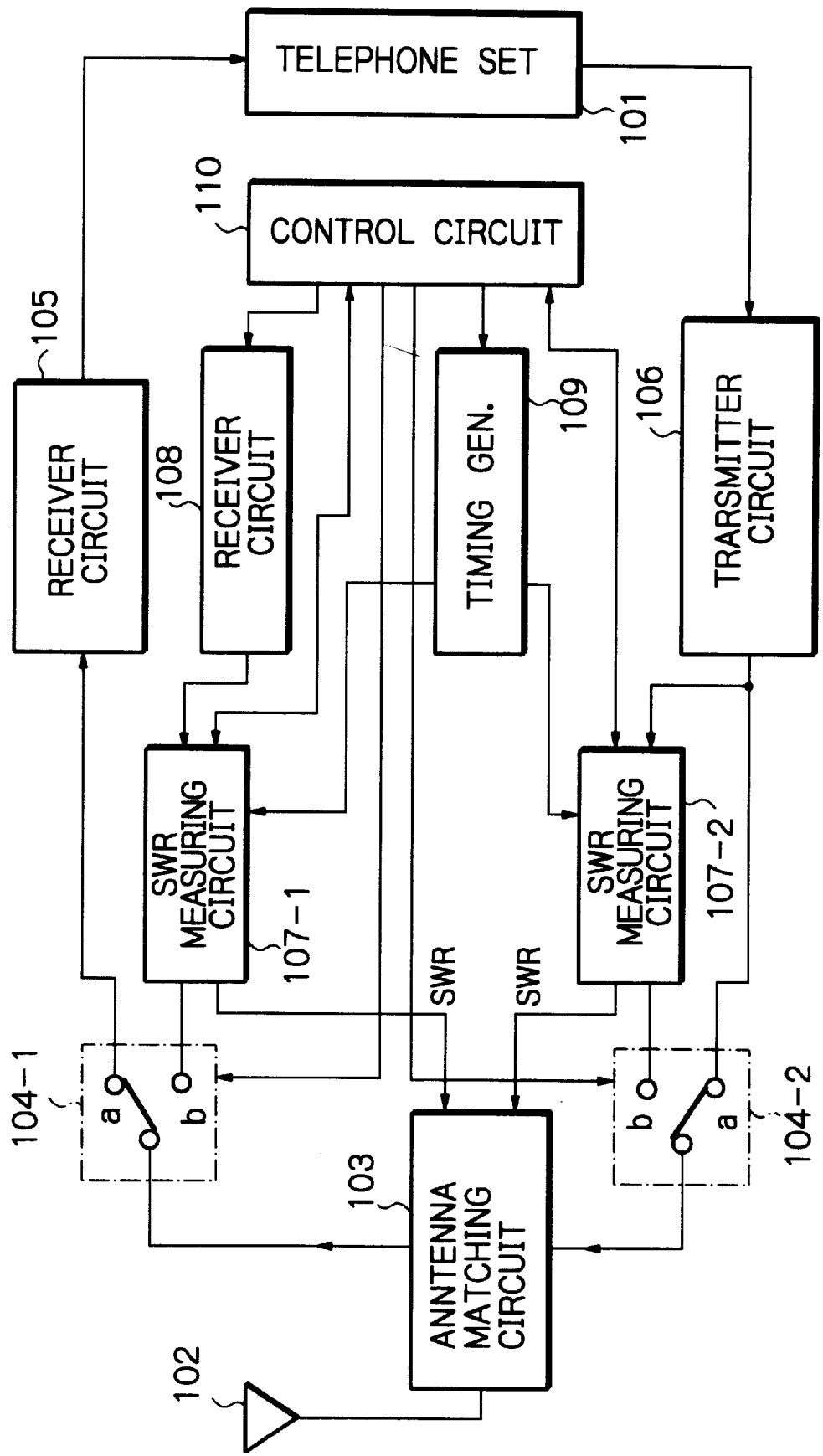
FIG. 1 is a block circuit diagram illustrating a prior art radio communication apparatus.

In FIG. 1, reference numeral 101 designates a telephone set, and 102 designates an antenna which is connected to an antenna matching circuit 103. The antenna matching circuit 103 is connected via a switch circuit 104-1 and a receiver circuit 105 to the telephone set 101, and also, the antenna matching circuit 103 is connected via a switch circuit 104-2 and a transmitter circuit 106 to the telephone set 101.

The switch circuits 104-1 and 104-2 are connected to SWR measuring circuits 107-1 and 107-2, respectively. In addition, the SWR measuring circuit 107-1 is connected to a synthesizer 108. Further, a timing generating circuit 109 is connected to the SWR measuring circuit 107-1.

The switch circuits 104-1 and 104-2, the SWR measuring circuits 107-1 and 107-2, the synthesizer 108 and the timing generating circuit 109 are controlled by a control circuit 110.

The transmitting operation of the radio communication apparatus of FIG. 1 is carried out by the control circuit 110. That is, the control circuit 110 controls the switch circuit 104-2 on the "a" side, so that the transmitter circuit 106 is connected to the antenna matching circuit 103, thus carrying out a usual transmitting operation.

On the other hand, the control circuit 110 controls the switch circuit 104-2 on the "b" side, so that the SWR measuring circuit 107-2 is connected to the antenna matching circuit 103, thus carrying out an antenna matching operation. That is, even when the antenna 102 is in a mismatched state where the resonance frequency is deviated from a predetermined frequency, the antenna matching circuit 103 moves the resonance frequency so that the resonance frequency is brought close to the predetermined frequency. Thus, the transmitting operation can be stabilized regardless of the environment of the radio communication apparatus which is, in this case, a mobile telephone apparatus.

Note that the SWR measuring circuit 107-2 (107-1) is formed by a reflection bridge and a power-to-voltage transformer. Generally, $$SWR = (1+|\Gamma|)/(1-|\Gamma|) \tag{1}$$

$$\Gamma = 10^{-RL/20} \tag{2}$$

where RL is a return loss. That is, the larger the return loss RL, the smaller the standing wave ratio SWR. Therefore, the antenna matching circuit 103 controls the resonance frequency, so that the standing wave ratio SWR of the SWR measuring circuit 107-2 is minimized.

In the radio communication apparatus of FIG. 1, however, although the standing wave ratio SWR is minimized, a mismatch between the transmitter circuit 106 and the antenna matching circuit 103 can not be completely removed, so that it is impossible to radiate radio waves from the antenna 102 at a maximum efficiency.

Figure 2:
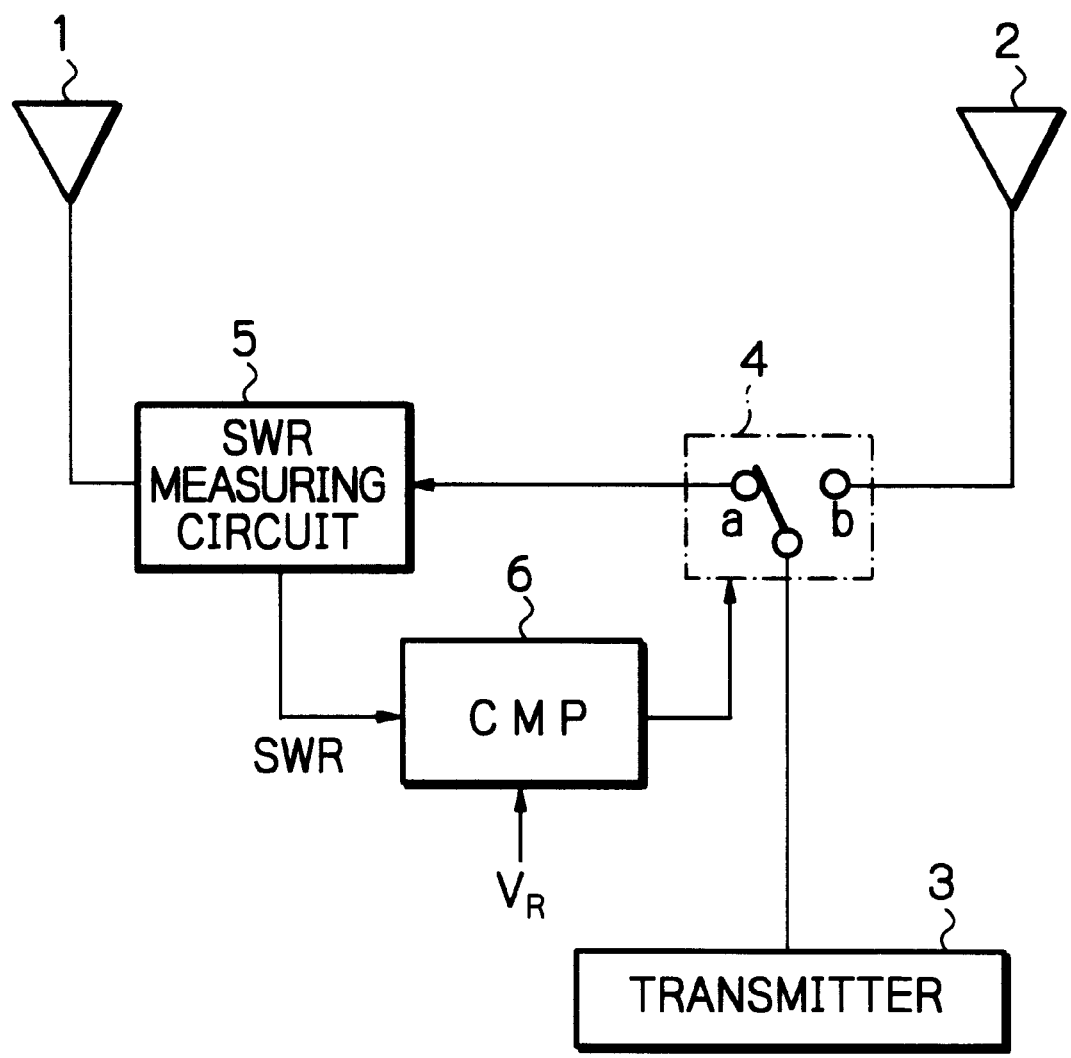
FIG. 2 is a block circuit diagram illustrating an embodiment of the radio communication apparatus according to the present invention.

In FIG. 2, which illustrates an embodiment of the radio communication apparatus according to the present invention, reference numeral 1 designates an antenna which can be mounted outside of an automobile and can be removed from the automobile. Also, reference numeral 2 designates a backup antenna which can be a whip antenna coupled with a transmitter (or transceiver) 3. The transmitter 3 is connected via a switch circuit 4 and an SWR measuring circuit 5 to the antenna 1, and also the transmitter 3 is connected via the switch circuit 4 to the backup antenna 2. The SWR measuring circuit 5 has the same configuration as the SWR measuring circuits 107-1 and 107-2.

The switch circuit 4 is controlled by a comparator circuit 6 for comparing the standing wave ratio SWR of the SWR measuring circuit 5 with a reference voltage $V_R$.

Note that the backup antenna 2 matches with the transmitter 3.

The switch circuit 4 is initially set on the "a" side, so that the transmitter 3 is connected via the switch circuit 4 and the SWR measuring circuit 5 to the antenna 1.

When the antenna 1 is removed from the apparatus or the like, the mismatching state occurs, so that the standing wave ratio SWR of the SWR measuring circuit 5 exceeds the reference voltage $V_R$. As a result, the comparator circuit 6 changes the switch circuit 4 from the "a" side to the "b" side. Therefore, radio waves are radiated from the backup antenna 2.

As explained hereinabove, according to the present invention, since the usual antenna and the backup antenna are provided and the switching from the usual antenna to the backup antenna is carried out by monitoring the standing wave ratio SWR of the usual antenna, two kinds of environments using the usual antenna and the backup antenna can be realized, in which it is possible to radiate radio waves at a maximum efficiency. Particularly, if the usual antenna is removed from an automobile or the like, the environment of the backup antenna is helpful.

I claim:

1. A radio communication apparatus comprising:

a first antenna;

a stands wave ratio measuring circuit, connected to said first antenna, for measuring a standing wave ratio of said first antenna;

a second antenna;

a transmitter;

a switch circuit, connected between said transmitter and said first and second antennas; and a comparator circuit, connected between said standing wave measuring circuit and said switch circuit, for controlling said switch circuit in accordance with the standing wave ratio measured by standing wave ratio measuring circuit, said switch circuit being controlled so that said transmitter is connected to said second antenna after the standing wave ratio measured by said standing wave ratio measuring circuit exceeds a predetermined value.

2. The apparatus as set forth in claim 1, wherein said first antenna is removable.

3. The apparatus as set forth in claim 1, wherein said second antenna matches with said transmitter.

4. The apparatus as set forth in claim 1, wherein said first antenna is mounted outside of an automobile, and said second antenna is coupled directly with said transmitter.

5. A radio communication apparatus comprising:

a plurality of antennas;

a transmitter;

a switch circuit, connected between said transmitter and said antennas, for connecting one of said antennas to said transmitter;

a control circuit, connected to one of said antennas and said switch circuit, for controlling said switch circuit in accordance with a standing wave ratio measured from said one of said antennas.

6. The apparatus as set forth in claim 5, wherein, when the measured standing wave ratio exceeds a predetermined value, said switch circuit connects said transmitter to another of said antennas.

* * * * *